Oct. 25, 1949.  C. W. TYDEMAN  2,486,227
HIGH-SPEED GRINDING SPINDLE
Filed June 19, 1947
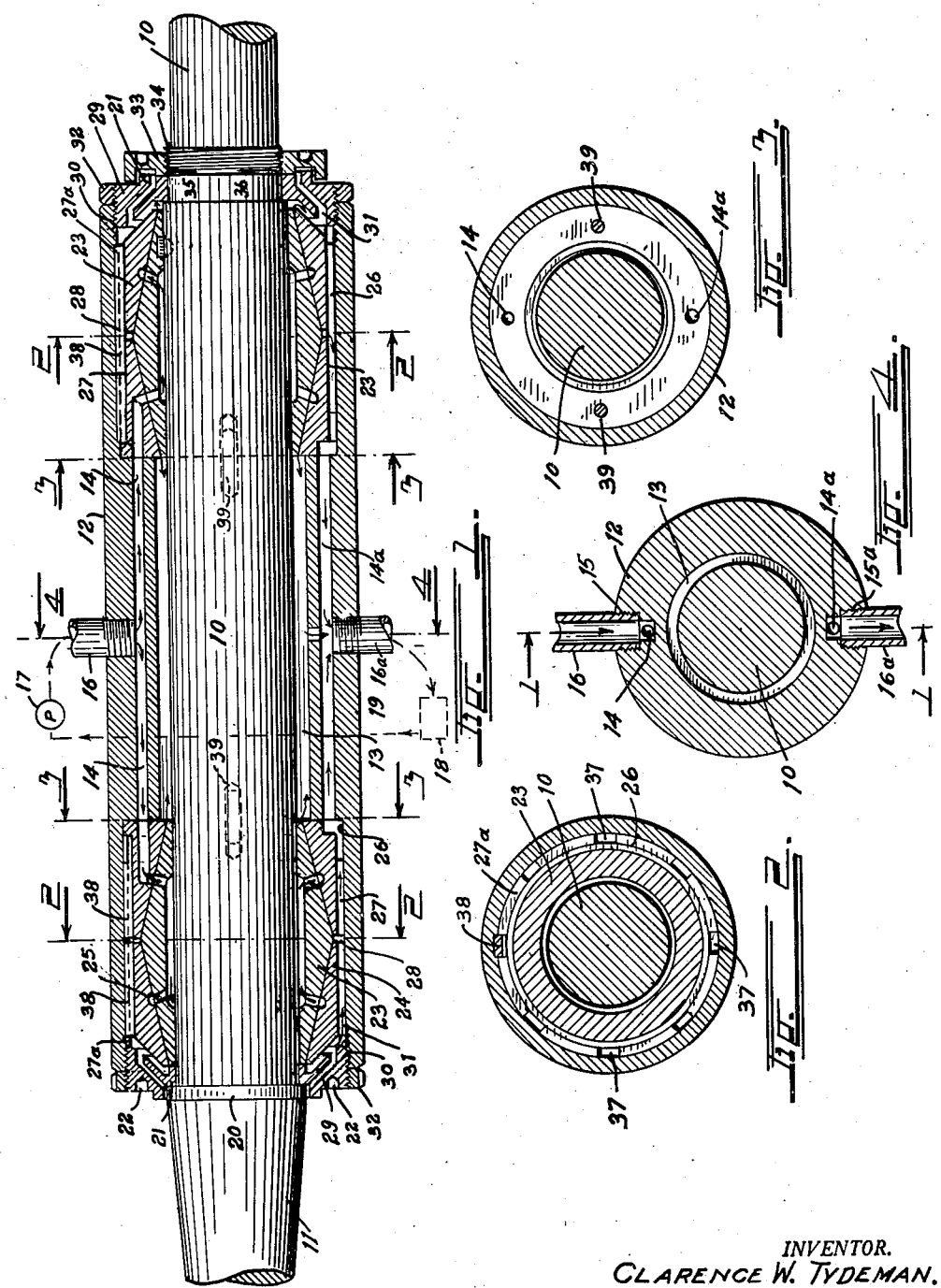
INVENTOR.
CLARENCE W. TYDEMAN.
BY
Martin E. Anderson
ATTORNEY.

Patented Oct. 25, 1949

2,486,227

UNITED STATES PATENT OFFICE 2,486,227

HIGH-SPEED GRINDING SPINDLE

Clarence W. Tydeman, San Mateo, Calif., assignor to General Engineering and Dry Dock Corporation, San Francisco, Calif., a corporation of Delaware Application June 19, 1947, Serial No. 755,796

5 Claims. (Cl. 308—122)

1

This invention relates to improvements in high speed grinding spindles.

In many places, more particularly in connection with grinders of various types, the grinding or abradant wheel must be rotated at a very high rate of speed. In order to prevent the bearing from wearing out too rapidly, it is necessary that the relatively movable parts shall be thoroughly lubricated and this must be accomplished by means of some pressure method of lubrication.

When lubricant is introduced under pressure, care must be taken to seal the bearings at the ends, for otherwise, the oil will be discharged at the ends of the bearing, which is very objectionable, and therefore it has been customary to provide such bearings with oil seals at each end. The usual type of oil seal has a friction contact with at least one of the relatively movable surfaces and is therefore subject to excessive wear.

It is the principal object of this invention to produce a bearing and spindle assembly of the type and for the purpose indicated which shall be so constructed that the oil seals do not come into frictional contact with the adjacent surfaces, but operate on a centrifugal principle which has proven to be very successful and which, in practice, eliminates every drop of leakage from the bearing.

In order to most clearly describe and explain this invention, reference will now be had to the accompanying drawing in which it has been illustrated in its preferred form and in which:

Figure 1 is a longitudinal diametrical section taken on line 1—1, Figure 4, and shows the several parts in their respective relative positions;

Figure 2 is a transverse section taken on lines 2—2, Figure 1;

Figure 3 is a transverse section taken on lines 3—3, Figure 1; and

Figure 4 is a transverse section taken on line 4—4, Figure 1.

In the drawing reference numeral 10 designates a steel spindle, one end of which is tapered as indicated at 11. The tapered end is for the reception of a grinding wheel or disk, which has not been shown. The shaft is, of course, driven from the end opposite the one that has been shown tapered. The bearing consists of an outer sleeve 12 that, in actual operation, is clamped to a machine in such a way as to be held stationary. The purpose for which the bearing and spindle is at present employed is for grinding threads and the sleeve 12 is, therefore, of course, rigidly secured in place to the machine. It is well understood that grinders for the purpose of grinding

2 threads, as well as for other purposes, must be mounted in such a way that the shaft is held securely against relative axial movement with respect to the bearing and this is accomplished in the present bearing by means which will be described presently.

In the present embodiment, sleeve 12, as will be seen from the drawing, is preferably provided with a cylindrical outer surface, although the shape of the outer surface is immaterial, and has an inner axial opening 13 of a somewhat larger diameter than the diameter of the shaft or spindle positioned therein. The wall of the sleeve is provided with two diametrically positioned longitudinally extending openings 14 and 14a, which form passageways for the lubricating oil. The sleeve is provided with threaded openings 15 and 15a that communicate with openings 14 and 14a. A lubricating inlet pipe 16 is threadedly connected with hole 15 and an outlet pipe 16a is threadedly connected with hole 15a. Reference numeral 17 designates an oil pump and reference numeral 18 an oil sump or reservoir. The pipe from the oil reservoir to the inlet port of the oil pump has been shown by dotted lines and designated by reference numeral 19.

Shaft 10 is provided adjacent the base of the tapered portion 11 with a cylindrical flange 20 which serves as an abutment for the centrifugal oil seal ring 21. This ring has a pressed fit with the shaft and is positioned in abutting relation to the adjacent side of flange 20. The oil seal ring has a frustoconical flange 22 that flares inwardly. In this description the end having tapered portion will be considered as the front of the spindle and bearing assembly. An inner bearing 23 is pressed onto the shaft in abutting relation with the hub of the oil seal ring and is held frictionally against movement relative to the shaft. It will be observed from an inspection of Figure 1 that bearing 23 has a section 24 of somewhat larger diameter than the shaft so as to form an annular oil passage. Radial openings 25 extend through the wall of bearing 23 in the manner shown in Figure 1.

Sleeve 12 is provided at each end with a cylindrical section whose inner walls have been designated by reference numeral 26. These enlarged cylindrical openings terminate along section lines 3 and the annular radial walls between the center opening 13 and the enlarged openings at each end form abutments for one portion of the outer tapered bearings 27. At this point, attention will be called to the fact that the inner bearing 23 tapers outwardly from its middle line, as shown in the drawing, so as to form with the outer bearings two frustoconical bearing surfaces. The other half of bearing 27 has been designated by reference numeral 27a. A slight space like that designated by reference numeral 28, is left between the bearing parts 27 and 27a, so as to permit a certain degree of adjustment for the purpose of tightening the bearing to compensate for wear. This adjustment is effected by means of the bearing adjusting ring 29 that is threadedly connected with the end of sleeve 12, as indicated at 30. It will be observed that ring 29 is provided with a flange 31 that engages the end of bearing 27a and therefore when 29 is rotated so as to move it inwardly, it will impart a corresponding movement to bearing member 27a. A locking ring 32 secures the bearing adjusting ring 29 in adjusted position. At the rear end of the bearing there is, in addition to the bearing adjusting ring 29, a retainer ring 33, which serves for holding the oil seal ring 21 in position and also serves as a dust seal. Ring 33 is held against longitudinal movement by some suitable means, as, for example, threads 34 positioned as shown. It will be noted that the internal diameter of the oil seal ring employed at the rear end of the bearing is somewhat less than that at the front end and the shaft is provided with a cylindrical section 35 of slightly smaller diameter so as to form a shoulder 36 that serves as a stop for the oil seal ring.

The bearing is symmetrical with respect to section 4 and the parts at the two ends are identical with the exception just noted, namely, that the oil seal rings 21 have slightly different diameter openings.

Let us now assume that the spindle and bearing assembly that has just been described is in operation, the spindle 10 rotating at a high speed and sleeve 12 being held stationary; the lubricating pump 17 will force lubricant inwardly through pipe 16 and this will then flow in opposite directions through the lubricating passage 14, passing from thence through the radial openings and inner bearings 23 into the annular oil chamber 24 and thence outwardly through radial openings 25. The lubricant will flow in two directions from the radial openings, parts of the lubricant will pass outwardly through the space 28 into the channels 37 and other portions of the lubricant will flow towards the end of the bearing and come into contact with the inner surface of the frustoconical flange 22 of the oil seal ring, and since this is rotating at a very high speed, the oil that escapes in this direction will be thrown outwardly by the centrifugal action of the oil seal ring, which acts like an impeller in a centrifugal pump. The oil thus discharged will flow through the channels 37 and finally enter opening 14a from whence it will pass into pipe 16a and be returned to the reservoir or oil sump 18. The bearings 27 and 27a are held against rotation relative to the sleeve by means of one or more keys 38. In addition to the keys, dowels like those designated by reference numeral 39 are provided between the wall of sleeve 12 and the inner conical bearings 27.

At this point attention will be called to the fact that the inner bearing 23 at the front end of the shaft is applied by a pressed fit so as to be seated rigidly and held against relative longitudinal movement by the friction between it and the spindle. The inner bearing 23 at the other end is held in place by means of a suitable key so as to prevent it from rotating relative to the shaft, but which permits it to have a slight longitudinal movement thereon. Due to the fact that the inner bearing ring 23 at the rear of the bearing assembly is movable, the shaft may expand or contract, as it will in response to temperature changes without setting up any substantial forces that would interfere with the free rotation of the spindle.

Due to the high speed of rotation of the shaft, the oil seal rings 21, with their frustoconical flanges 22, function to turn any oil towards the center, thereby preventing any of the lubricating oil from escaping from the bearing. This oil seal is entirely without friction and therefore does not wear in the manner of an ordinary packing or oil seal that has a sliding contact with one of the members.

By means of the construction shown on the drawing and described herein, a steady circulation of lubricant within the bearing can be had with the assurance that the parts will always be sufficiently lubricated to prevent undue wear. The lubricant can be recirculated as long as desired. The double conical bearings at each end, together with means for adjusting the same, makes it possible to keep the bearing in properly adjusted condition, and to compensate for such wear as may take place without disturbing the adjustment of the shaft relative to the front end of the bearing.

Having described the invention what is claimed as new is:

1. In a high speed bearing and spindle assembly comprising, a tubular sleeve having its intermediate portion of less diameter than the ends, two angularly spaced passages extending longitudinally through the wall of the intermediate portion, a lubricating pump having its outlet port in communication with one of said passages and its intake port in communication with the other passage, an outer bearing in each end of the sleeve, a spindle journaled in the bearings, the lubricating pump forming a means for forcing oil outwardly between the bearing surface, the passage in communication with the intake port of the pump being in communication with the outer ends of the bearings, and an oil seal ring secured to the spindle at each end of the sleeve, said ring having a frustoconical flange flaring outwardly and towards the middle point of the sleeve, said flange terminating within the ends of the sleeve, whereby any oil contacting the inner surface of the flange will be thrown outwardly into engagement with the inner surface of the sleeve, in position to be returned to the pump.

2. A high speed spindle and bearing assembly comprising, a stationary tubular sleeve provided at each end with a cylindrical section of greater diameter than the intermediate portion, a two-part cone bearing positioned in each end section, one of the bearing parts abutting the shoulders between the two sections of different diameters, means comprising a key for interconnecting the cone bearings with the sleeve to resist rotary forces while permitting the cone bearing parts nearer the ends of the sleeve to move axially relative to the stationary inner parts, means comprising a ring threadedly connnected with the inner surface of the sleeve, for adjusting the relative positions of the cone bearing parts, means comprising a lock nut for securing the threaded ring in adjusted position, the thick intermediate wall portion of the sleeve having two longitudinally extending passages, positioned in angularly spaced relation, communicating the enlarged end sections, the bearing parts nearest the center having their inner surfaces provided with annular grooves, their ends having openings communicating with one of the passages in the sleeve, a spindle mounted for rotation in the sleeve, two double outwardly tapering bearing sleeves secured to the spindle in position to cooperate with the two pairs of bearing parts in the ends of the sleeve, one of the bearing sleeves being secured against longitudinal movement on the spindle, the other bearing sleeve being longitudinally movable to permit unequal expansion between the spindle and the sleeve, the openings in the bearing sleeves having an enlarged central section forming an oil passage adjacent the spindle, the bearing sleeve walls having at least one opening at each end of the enlarged center section, the opening in the bearing sleeve communicating with the groove in the inner bearing part, an oil pump having its delivery port in communication with one of the longitudinal passages in the intermediate sleeve portion, an oil seal ring carried by the spindle at the end of each of the outer bearing blocks, said rings having inwardly flaring flanges for directing any oil moving outwardly towards the middle point of the bearing, into position to be returned to the pump, thereby preventing leaks.

3. A high speed bearing and spindle assembly comprising, an elongated sleeve provided at each end with a section of greater diameter than the intermediate portion, the thick wall portion of the intermediate part of the sleeve having at least two oil passages communicating the enlarged end sections, each end section having a pair of substantially identical axially aligned outer bearings whose inner surfaces are oppositely frustoconical, the inner bearing of each pair having its smaller diameter end in abutting relation with the adjacent end of the intermediate sleeve section and provided with a hole adapted to register with one of the passages in the intermediate section, means for holding the sleeve and bearing section in predetermined relative rotary position, the inner surfaces of the said inner bearing sections having each an oil groove in communication with one oil passage, a lubricating pump having its delivery port in communication with the last mentioned oil passage and its intake port in communication with the other oil passage, the other outer bearing of each pair having an oil groove on its inner surface, the spindle having a bearing ring that tapers outwardly from its middle point, the outer surface of the bearing ring being tapered to fit the inner surfaces of the corresponding outer bearings, the opening in the bearing ring having an intermediate portion of greater diameter than the end sections forming with the spindle an annular chamber, openings communicating the ends of said annular chamber with the outside, in position to register with the grooves in the inner surface of the outer bearings of the two pairs of bearing members, means comprising an annular nut threadedly connected with the sleeve for adjusting the outer bearing of each pair relative to the inner bearings, and oil seal rings secured to the spindle adjacent to and within the ends of the sleeve, said rings having each a frustoconical flange, flaring outwardly, in the direction of the bearing, for directing oil outwardly against the inside of the sleeve in position to be returned to the pump.

4. A high speed spindle and bearing assembly comprising, an elongated tubular sleeve having a section near one end of larger diameter than the adjacent section, a double cone bearing in the enlarged section, said bearing comprising two bearing members of substantially equal outside diameters, forming a pair each having a key slot in its outer surface, the inner surfaces being frustoconical in opposed relation and outwardly tapering, a key carried by the inner surface of the sleeve, positioned to project into the key slots in the bearings to hold the bearings and the sleeve in predetermined angular relation, a spindle extending through the sleeve and through the double cone bearing, a bearing sleeve on the spindle, said sleeve being tapered from a center point towards the ends, to fit the outer bearings, means for adjusting the outer cone bearing of the pair relative to the inner bearing, comprising, a ring having a threaded engagement with the end of the sleeve, a portion of the ring engaging the outer cone bearing member of the pair for positioning it relative to the inner cone bearing, to compensate for wear, and means for forcing lubricating oil between the relatively movable bearing surfaces comprising an oil pump.

5. In a high speed bearing and spindle assembly comprising, a tubular sleeve having its intermediate portion of less diameter than the ends, two angularly spaced passages extending longitudinally through the wall of the intermediate portion, a lubricating pump having its outlet port in communication with one of said passages and its intake port in communication with the other passage, an outer bearing in each end of the sleeve, a spindle journaled in the bearings, the lubricating pump forming a means for forcing oil outwardly between the bearing surface, the passage in communication with the intake port of the pump being in communication with the outer ends of the bearings, and an oil seal ring secured to the spindle at each end of the sleeve, said ring having a radially extending flange terminating within the ends of the sleeve, whereby any oil contacting the inner surface of the flange will be thrown outwardly into engagement with the inner surface of the sleeve, in position to be returned to the pump.

CLARENCE W. TYDEMAN.

REFERENCES CITED

The following references are of record in the file of this patent:

UNITED STATES PATENTS

| Number | Name | Date |
| --- | --- | --- |
| 1,413,425 | Rice | Apr. 18, 1922 |
| 2,317,981 | De Vlieg | May 4, 1943 |
| 2,344,571 | Turrettini | Mar. 21, 1944 |
| 2,389,687 | Rickenmann | Nov. 27, 1945 |